US012053429B2

(12) United States Patent
Boyd

(10) Patent No.: US 12,053,429 B2
(45) Date of Patent: Aug. 6, 2024

(54) WALKER SPECIALIZED FOR TRAIL USE

(71) Applicant: Jack Boyd, Las Vegas, NV (US)

(72) Inventor: Jack Boyd, Las Vegas, NV (US)

( * ) Notice: Subject to any disclaimer, the term of this patent is extended or adjusted under 35 U.S.C. 154(b) by 0 days.

(21) Appl. No.: 18/165,905

(22) Filed: Feb. 7, 2023

(65) Prior Publication Data

US 2023/0218471 A1   Jul. 13, 2023

Related U.S. Application Data

(63) Continuation-in-part of application No. 16/551,428, filed on Aug. 26, 2019, now Pat. No. 11,571,354.

(60) Provisional application No. 62/765,415, filed on Aug. 25, 2018.

(51) Int. Cl.
| | | |
|---|---|---|
| *A61H 3/04* | (2006.01) | |
| *B62K 3/02* | (2006.01) | |
| *B62K 3/16* | (2006.01) | |
| *B62K 11/02* | (2006.01) | |
| *B62K 15/00* | (2006.01) | |
| *B62L 3/02* | (2006.01) | |
| *B62J 7/00* | (2006.01) | |

(52) U.S. Cl.
CPC ............. *A61H 3/04* (2013.01); *B62K 3/02* (2013.01); *B62K 3/16* (2013.01); *B62K 11/02* (2013.01); *B62K 15/006* (2013.01); *B62L 3/02* (2013.01); *A61H 2003/043* (2013.01); *A61H 2003/046* (2013.01); *A61H 2201/0161* (2013.01); *A61H 2201/1633* (2013.01); *A61H 2201/1635* (2013.01); *A61H 2201/164* (2013.01); *B62J 7/00* (2013.01); *B62K 2204/00* (2013.01)

(58) Field of Classification Search
CPC .......... A61H 3/04; A61H 3/043; A61H 3/046; A61H 2003/006; A61H 2201/164; A61H 2003/046; B62K 3/16; B62K 9/00; B62B 3/009; B62L 3/02
USPC ........................................ 188/24, 14, 15, 19
See application file for complete search history.

(56) References Cited

U.S. PATENT DOCUMENTS

| | | | | |
|---|---|---|---|---|
| 3,759,352 A | * | 9/1973 | Toplis ...................... | B62L 3/02 |
| | | | | 414/730 |
| 6,102,420 A | * | 8/2000 | Hoeksta ................. | B62K 21/00 |
| | | | | 482/68 |
| 7,025,362 B1 | * | 4/2006 | Gomez .................. | B62K 19/46 |
| | | | | 280/47.11 |
| 2008/0114519 A1 | * | 5/2008 | DuFaux .................... | B60T 7/16 |
| | | | | 701/70 |

(Continued)

FOREIGN PATENT DOCUMENTS

CN        109665014 A  *  4/2019

OTHER PUBLICATIONS

Bicycling Australia; An Introduction to Hubs; https://bicyclingaustralia.com.au/news/an-introduction-to-hubs/; published Jan. 30, 2017; accessed Mar. 31, 2023. (Year: 2017).*

*Primary Examiner* — Daniel J Colilla
(74) *Attorney, Agent, or Firm* — Nolan IP Law; Jason M. Nolan

(57) ABSTRACT

A walker specialized for use on trails by pushing and walking, rather than riding on, with no drivetrain, along with a method of using the walker on trails is provided. The walker can include a frame, two inline wheels, and a handlebar steering mechanism. The walker can further include a braking mechanism, an elbow rest, an electric motor, and racks and/or carriers for gear.

16 Claims, 5 Drawing Sheets

(56) References Cited

U.S. PATENT DOCUMENTS

2016/0075400 A1\* 3/2016 Ragland ................ B62K 11/04
                                                                           29/401.1
2017/0001656 A1\* 1/2017 Katayama ................ A61H 3/04

\* cited by examiner

WALKER SPECIALIZED FOR TRAIL USE

CROSS-REFERENCE TO RELATED APPLICATIONS

This is a continuation-in-part of U.S. patent application Ser. No. 16/551,428 filed on Aug. 26, 2019, which claims the benefit of priority under 35 U.S.C. § 119(e) of U.S. Provisional Application Ser. No. 62/765,415 filed Aug. 25, 2018, the content of which is relied upon and incorporated herein by reference in its entirety, and the benefit of priority under 35 U.S.C. § 120 is hereby claimed.

FIELD

The present invention relates to walkers that are specialized for rugged trail use by handicapped and non-handicapped persons. The walkers of the invention will provide walking assistance for handicapped people who require walking assistance and for non-handicapped people who need walking assistance while carrying items and gear. Other walkers of the invention are specialized for use on non-rugged trails, paved walkways and in buildings. Other walkers of the invention have electrical assist to assist the pushing burden, especially for uphill and level travel.

BACKGROUND

Degenerative changes of the spine are seen in 95% of people by the age of 50 years. A common spinal degeneration is lumbar spinal stenosis (LSS). This is a narrowing and pinching of the nerves that come through the spinal foramen at the nerve roots. The incidence of LSS in the United States has been estimated at about 10 percent of the population. As the "baby boomers" age, an estimated 2.4 million Americans will be affected by LSS by 2021.

Burning pain in buttocks or legs (sciatica) frequently occurs with LLS and other spinal disorders. Pressure on spinal nerves can result in pain in the areas that the nerves supply. The pain may be described as an aching or a burning feeling. It typically starts in the area of the buttocks and radiates down the leg. As it progresses, it can result in pain in the foot. Numbness or tingling in buttocks, feet or legs is another common symptom. As pressure on the nerve increases, numbness and tingling often accompany the burning pain, although not all sufferers of LLS will have all of those symptoms.

The medical literature documents that less pain often occurs with leaning forward called forward lumbar flexion while standing or sitting. Studies of the lumbar spine show leaning forward can increase the space available for the nerves exiting the spine and thusly relive pain. Many sufferers of LLS may note immediate relief when leaning forward and sitting. Pain is usually made worse by standing and walking. Some patients note that they can ride a bicycle or walk leaning on a shopping cart for long periods of time, many hours, with little or no pain, but walking without leaning forward support for more than a few minutes often brings on severe, unbearable leg and back pain.

Forward lumbar flexion, accomplished by leaning forward on something like a shopping cart, opens the spine and may reduce nerve compression and pain symptoms. The North American Spine Society (NASS) has released a set of recommendations that stress the utilization of conservative methods of treatment, such as assisted walking, before considering surgery which is both costly and dangerous. The Journal of Family Practice (Goldman et al., Journal of Family Practice, V57, pp 257-260, April, 2008), which is incorporated herein by reference, recommends using a four or three wheeled walker, with the leaning forward position. In this study, 87% of patients reported relief during walking using a 3- or 4-wheeled walker and a leaning forward position. Besides spinal disorder sufferers, other persons will benefit from the present invention. For example, older people are no longer able to carry as much weight as they did when younger because of other joint related disorders, such as osteoarthritis and osteoporosis, being older in general, and faster fatigue than when younger. Any weight carrying medical conditions will be improved by not carrying weight as carried when using a backpack and will be benefited by the walkers of the invention.

Physical activity is especially beneficial in persons over 50 and physical activity will be encouraged by walking assist devices such as the walkers of the invention. Physical activity can keep the body and mind strong. Therefore, older persons need devices to assist walking and exercise, especially suffers of spinal conditions such as LLS in which walking a short distance causes pain, and sufferers of other disorders, for example, weight carrying disorders, arthritis, osteoporosis, limb loss and easy fatigue.

While 3- and 4-wheeled walkers with non-inline wheels can relieve walking related pain, those walkers are not suitable for many activities desired by active persons. For example, standard 3- and 4-wheeled walkers are not suitable to carry weight on rugged trails because the wheels are not inline, they have a narrow front to back wheelbase, and they are difficult if not impossible to manipulate over rugged terrain. Many over 40 years old sufferers of walking problems, especially those that have led an active life, would like a walker that increases their activities beyond the capability of standard 3- and 4-wheeled walkers. A walker to reduce weight on the body while backpacking would allow handicapped persons or persons with weight carrying disorders to increase their use of rugged and non-rugged trails and walkways.

Another problem with standard 3- or 4-wheeled walkers is that they are slow and cumbersome in airports and public areas. For example, they can't carry many items and gear, such as, luggage, supplies, clothing, shelter, gear, water, food, weapons, and the like. The walkers of the invention are much more nimble the standard 3- or 4-wheeled walkers and they are designed to carry weight.

Wheeled trail devices are available as "game carts", for carrying hunting gear into and out of rugged areas. However, one or two wheeled game carts are specialized for hunting and are not specialized for handicapped persons walking on trails and walkways, persons seeking walking assistance on trails, weight carrying on trails, or for backpacking. For example, they do not allow the forward lumbar flexion-accomplished by leaning forward and leaning on something to reduce weight and provide relief for LLS sufferers. Some game carts don't have inline wheels.

Push bicycles are known, but they are child's toys, such as scooters. There are no walkers specialized for rugged and non-rugged trail use and walkway use with two wheels inline to make the walker less cumbersome, more nimble, and ease trail use, or specialized for handicapped walking assistance on trails while pushing and walking and carrying items and gear. There are no walkers with two wheels inline that are specialized to reduce weight on the back and spine, and reduce fatigue. There are no walkers with two wheels inline specialized for rugged trail use to carry items and gear, such as, luggage, supplies, clothing, shelter, gear, water, food, weapons, and the like.

SUMMARY

In various embodiments, a walker for pushing and walking to the side of is provided, the walker comprising: a bicycle frame; front and rear inline wheels coupled to the bicycle frame; wherein the bicycle frame defines a wheelbase between the front and rear inline wheels; a handlebar steering mechanism coupled to a first end of the bicycle frame; and a first brake mechanism coupled to the handlebar and the front inline wheel or the rear inline wheel, the first brake mechanism comprising adjustable and settable controls that can increase or decrease the braking force applied to the respective inline wheel to reduce forward-sliding during downhill travel on an inclined surface; wherein the walker has no pedals.

In some embodiments, the walker further comprises one or more racks coupled to the bicycle frame, wherein each respective rack is configured to carry removably attachable items or gear.

In some embodiments, the first brake mechanism comprises a controller coupled to the handlebar, a first brake coupled to the respective inline wheel, and a first cable connecting the controller and the brake.

In some embodiments, the adjustable and settable controls can increase or decrease the braking force applied to the respective inline wheel to prevent runaway during downhill travel on the inclined surface.

In some embodiments, the bicycle frame and the front and rear inline wheels are configured for use on an off-road trail.

In some embodiments, the walker further comprises a second brake mechanism coupled to the handlebar and the front inline wheel or the rear inline wheel; the second brake mechanism comprising adjustable and settable controls that can incrementally increase or decrease the braking force applied to the respective incline wheel to prevent runaway during downhill travel on the inclined surface.

In some embodiments, the second brake mechanism comprises the controller coupled to the handlebar, a second brake coupled to the respective inline wheel, and a second cable connecting the controller and the brake.

In some embodiments, the first brake mechanism and the second brake mechanism are not coupled to same respective inline wheel.

In some embodiments, the walker further comprises an electric motor coupled to the front inline wheel or the rear inline wheel, the electric motor being powered by a battery.

In some embodiments, the walker further comprises an elbow rest coupled to a longitudinal centerline bar of the bicycle frame between the handlebar steering mechanism and a second end of the bicycle frame.

In various embodiments, a walker for pushing and walking to the side of is provided, the walker comprising: a bicycle frame; front and rear inline wheels, each coupled to the bicycle frame with a respective hub; wherein the bicycle frame defines a wheelbase between the front and rear inline wheels; a handlebar steering mechanism coupled to a first end of the bicycle frame; and an in-hub brake mechanism in the hub of the front inline wheel or the rear inline wheel, the in-hub brake mechanism configured to apply a stopping force to the respective inline wheel to prevent backsliding during uphill travel on an inclined surface; wherein the walker has no pedals.

In some embodiments, the in-hub brake mechanism comprises a ratchet mechanism or a pawl and drive ring system.

In various embodiments, a method of transporting an item or gear on a trail having an inclined surface is provided, the method comprising: providing a walker for pushing and walking to the side of, the walker comprising: a bicycle frame; front and rear inline wheels coupled to the bicycle frame; wherein the bicycle frame defines a wheelbase between the front and rear inline wheels; a handlebar steering mechanism coupled to a first end of the bicycle frame; a first brake mechanism coupled to the handlebar and the front or rear inline wheel, the first brake mechanism comprising adjustable and settable controls that can increase or decrease the braking force applied to the respective incline wheel to reduce forward-sliding during downhill travel on the inclined surface of the trail; and one or more racks coupled to the bicycle frame, wherein each respective rack is configured to carry a removably attachable item or gear; wherein the walker has no pedals; attaching the item or gear to the respective rack coupled to the bicycle frame; setting the adjustable and settable controls of the first brake mechanism; and pushing the walker on the trail having the inclined or declined surface.

In some embodiments, the first brake mechanism comprises a controller coupled to the handlebar, a first brake coupled to the respective inline wheel, and a first cable connecting the controller and the brake.

In some embodiments, the adjustable and settable controls can increase or decrease the braking force applied to the respective inline wheel to prevent runaway during downhill travel on the inclined surface of the trail.

In some embodiments, the walker further comprises a second brake mechanism coupled to the handlebar and the front inline wheel or the rear inline wheel; the second brake mechanism comprising adjustable and settable controls that can increase or decrease the braking force applied to the respective incline wheel to prevent runaway during downhill travel on the inclined surface of the trail.

In some embodiments, the second brake mechanism comprises the controller coupled to the handlebar, a second brake coupled to the respective inline wheel, and a second cable connecting the controller and the brake.

In some embodiments, the first brake mechanism and the second brake mechanism are not coupled to same respective inline wheel.

In some embodiments, the walker further comprises an electric motor coupled to the front inline wheel or the rear inline wheel, the electric motor being powered by a battery.

In some embodiments, the walker further comprises an elbow rest coupled to the longitudinal centerline bar of the bicycle frame between the handlebar steering mechanism and a second end of the bicycle frame.

In some embodiments, the bicycle frame and the front and rear inline wheels are configured for use on an off-road trail.

In various embodiments, a walker for pushing and walking to the side of is provided. The walker can include: a bicycle frame comprising a longitudinal centerline bar; two inline wheels coupled to the bicycle frame; wherein the bicycle frame defines a wheelbase between the two inline wheels; a handlebar steering mechanism coupled to a first end of the bicycle frame; and an elbow rest coupled to the longitudinal centerline bar of the bicycle frame between the handlebar steering mechanism and a second end of the bicycle frame, wherein the elbow rest is configured for a user to lean on while walking to the side of the walker; and wherein the walker has no drivetrain.

In some embodiments, the bicycle frame and the two inline wheels are configured for use on off-road trails.

In some embodiments, the elbow rest comprises a height adjustable component for adjusting the distance between the elbow rest and the longitudinal centerline bar.

In some embodiments, the walker includes the brake mechanism coupled to the handlebar.

In some embodiments, the walker includes a seat or footrest.

In some embodiments, the walker includes a rack coupled to the frame, wherein the rack is configured to carry gear.

In some embodiments, the walker reduces an amount of weight carried by a spine of a user.

In some embodiments, the wheelbase is between 15 and 60 inches.

In some embodiments, the two inline wheels each have an outside diameter of between 5 inches and 40 inches.

In some embodiments, the brake mechanism comprises adjustable and settable controls that can be adjusted to an incline of an inclined terrain to reduce forward-sliding during downhill travel on the inclined terrain.

In some embodiments, the brake mechanism is configured to prevent runaway during downhill travel on an inclined terrain by applying a stopping force to the walker when the handlebar is released.

In various embodiments, a walker for pushing and walking to the side of is provided. The walker can include: a bicycle frame; two inline wheels coupled to the bicycle frame, wherein each of the respective inline wheels has an outside diameter that is greater than 10 inches; an electric motor coupled to one of the two inline wheels, the electric motor being powered by a battery; wherein the bicycle frame defines a wheelbase between the two inline wheels; a handlebar steering mechanism coupled to a first end of the bicycle frame; a first brake mechanism coupled to the handlebar, the first brake mechanism comprising adjustable and settable controls that can be adjusted to an incline of an inclined terrain to reduce forward-sliding during downhill travel on the inclined terrain; wherein the walker has no pedals. In some embodiments, the walker includes a second brake mechanism coupled to the handlebar, the second brake mechanism configured to prevent runaway during downhill travel on an inclined terrain by applying a stopping force to the walker when the handlebar is released.

In various embodiments, a walker for pushing and walking to the side of is provided. The walker can include a bicycle frame comprising a longitudinal centerline bar; two inline wheels coupled to the bicycle frame; an electric motor coupled to one of the two inline wheels, the electric motor being powered by a battery; wherein the bicycle frame defines a wheelbase between the two inline wheels; a handlebar steering mechanism coupled to a first end of the bicycle frame; an elbow rest coupled to the longitudinal centerline bar of the bicycle frame between the handlebar steering mechanism and a second end of the bicycle frame, wherein the elbow rest is configured for a user to lean on while walking to the side of the walker; and wherein the walker has no pedals.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein and, together with the description, explain the principles and operations of the claimed subject matter.

BRIEF DESCRIPTION OF THE DRAWINGS

A complete understanding of the present embodiments and the advantages and features thereof will be more readily understood by reference to the following detailed description, appended claims, and accompanying drawings, wherein:

Figure 1:
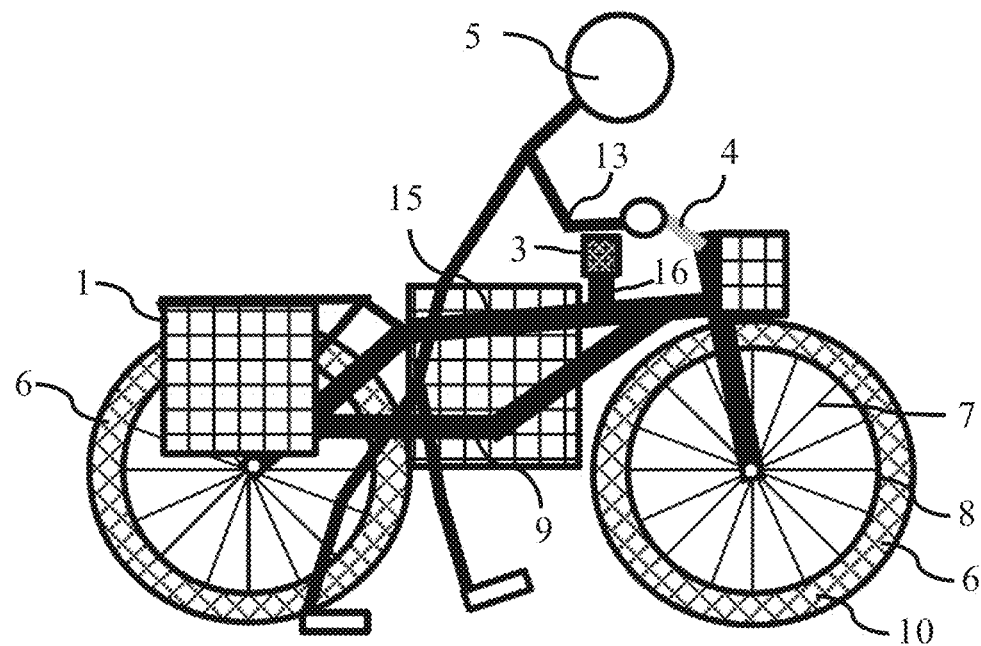
FIG. 1 shows a side view of a walker, in accordance with embodiments disclosed herein.

The drawings are not necessarily to scale, and certain features and certain views of the drawings may be shown exaggerated in scale or in schematic in the interest of clarity and conciseness.

DETAILED DESCRIPTION

Reference will now be made in detail to the exemplary embodiment(s), examples of which is/are illustrated in the examples. Before describing the exemplary embodiments, it is noted the embodiments reside primarily in combinations of components and subcomponents related to a walker specialized for trail use and methods of using the same. Accordingly, the product and method components have been represented where appropriate, showing only those specific details that are pertinent to understanding the embodiments of the present disclosure so as not to obscure the disclosure with details that will be readily apparent to those of ordinary skill in the art having the benefit of the description herein.

The specific details of the various embodiments described herein are used for demonstration purposes only, and no unnecessary limitation or inferences are to be understood therefrom.

The present invention is a walker specialized for trail use with two inline wheels, with a breaking mechanism, with a handlebar steering mechanism, with no drivetrain for non-electrical motor embodiments, and with optional racks and optional carriers for items and gear. The walkers of the invention are specialized for pushing and walking rather than riding-on although they optionally may be ridden-on in some coasting situations, for example, going downhill. The walkers of the invention have no drivetrain unless they have an electrical assist motor. Because the walkers of the invention are specialized for pushing rather than riding-on, they can be lower weight than standard ride-on bicycles. The walkers of the invention are for persons desiring walking assistance for a variety of reasons, for example, handicapped persons or non-handicapped persons who want to use trails or who want to use trails while transporting items and gear. The walkers of the invention provide support and forward lumbar flexion while walking and while walking transporting items and gear which can relieve pain and reduce fatigue. Embodiments of the present invention are walkers used by persons with walking concerns or walking limitations, handicapped or non-handicapped, who want assistance while walking or who want assistance while walking while transporting items and gear with less pain, with less fatigue, with greater support, and with less items and gear carried on the body.

Embodiments of the present invention are walkers used to provide walking assistance and support over more rugged terrain than possible with current 3- or 4-wheel walkers or carts. walkers used to provide walking assistance to both handicapped and non-handicapped persons on rugged trails. Other embodiments of the present invention are walkers specialized for use on non-rugged trails, on paved walkways and in buildings. Other embodiments of the walker of the invention have an electrical assist motor. A walker of the invention with an electrical assist motor will not have pedals as part of the drivetrain because it is for walking and pushing and not riding-on.

In this patent the word "and" can also mean "or" and "or" can also mean "and." Plural can also mean singular and singular can mean plural.

A "handicapped person" as discussed herein is a person that is unable to comfortably walk unaided for long distances, for example, approximately five miles or less or is unable to walk unaided while carrying weight, for example, a person with spinal stenosis, other joint disorders, arthritis, spinal disorders, limb loss, hip, back, spine, foot, ankle, shoulder, neck, knee disorders, or weight carrying restrictions. A handicapped person of this invention is a person with any weight carrying restrictions. Many persons have medical weight carrying restrictions at, for example, 50 pounds, or 25 pounds, or 10 pounds and these persons would be considered handicapped. The walker of the invention will benefit handicapped persons in walking and walking while transporting items and gear.

Embodiments of the present invention are walkers specialized for trail use. A trail means an unpaved walkway which can be steep, narrow, or rugged or can be smooth, open or non-rugged and anything between. The walkers of the invention have two inline wheels, a handlebar steering mechanism, a breaking mechanism, no drivetrain for non-electrical motor assist embodiments, and optional racks and optional carriers for transporting items and gear. Embodiments of the walkers of the invention are further specialized for pushing and walking rather than riding on so they have no drivetrain for non-electrical motor assist embodiments. What is meant by a standard or ride-on bicycle are the common bicycles in wide use that have pedals and a drivetrain to transmit leg or arm power to the wheels. A wide variety of ride-on bicycles designs for a wide variety of uses are known in the ride-on bicycle art.

Since the walker of the invention is specialized for pushing and not ridding-on many of the specialized features of the walker of the invention will differ from a ride-on bicycle. For example, embodiments of the walkers of the invention can be lighter than a ride-on bicycle because the walkers of the invention have no drivetrain for non-electrical motor assist embodiments and have no pedals. A pedal is each of a pair of foot-operated levers used for powering a bicycle propelled by the arms or legs. A bicycle drivetrain is the pedals, chain, belts, or gears used to transmit power from the pedals to the wheels. The walker of the invention also does not need the structural weight associated with balancing and carrying a person. Other embodiments of the walker of the invention can carry items and gear in locations that would be impractical for a ride-on bicycle.

For example, a fully loaded backpack for a backpacker might weigh 50 lbs., and that load could be transported by a backpacker but only with great effort. That same 50 lbs. placed on a walker of the invention could be transported with a fraction of the effort, thus providing walking and item and gear carrying assistance to both handicapped and non-handicapped persons. The gear and items carried using a walker of the invention would allow more gear and items to be transported greater distances with less fatigue than possible using a backpack.

Other embodiments of the invention are walkers specialized for use on non-rugged trails, on paved walkways and in buildings. Walkers of the invention specialized for non-rugged trails, paved walkway and buildings can be of less rugged construction than walkers of the invention specialized for rugged trail use. Other embodiments of the walker of the invention specialized for use on non-rugged trails, on paved walkways and in buildings optionally can carry items and gear. Walkers of the invention specialized for non-rugged trails, paved walkways and building will have two inline wheels, a handlebar steering mechanism, a breaking mechanism, no drivetrain for non-electrical motor assist embodiments, and optional racks and optional carriers for transporting items and gear.

The phrase "walker of the invention" means a walker similar to a ride-on bicycle that is specialized for trail and walkway use while pushing rather than riding on. The walkers of the invention have two inline wheels, a handlebar steering mechanism, a breaking mechanism, no drivetrain for non-electrical motor assist embodiments and optionally racks and carriers for transporting items and gear. Other embodiments of the walker of the invention have an electrical assist motor. A walker or the invention with an electrical assist motor will not have pedals as part of the drivetrain but will have all the rest of the specifications detailed herein specifically two inline wheels, a handlebar steering mechanism, a breaking mechanism, and optionally racks and carriers for transporting items and gear.

Figure 2:
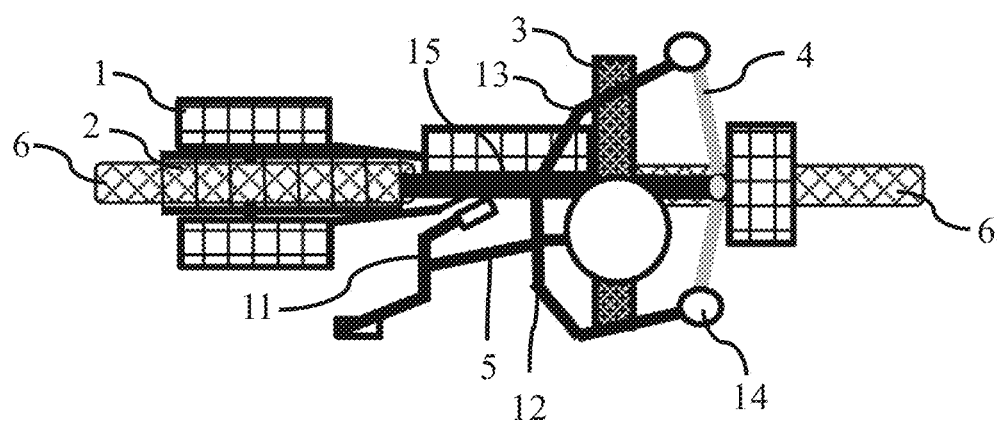
FIG. 2 shows a top view of the walker of FIG. 1.

The drawings in FIGS. 1-6 show embodiments of a walker of the invention and an operator 5. The operator is shown in a leaning forward position with hands 14 on the handlebar 4 and in front of the operator's hips by about 30 inches. Possible placements of optional item and gear carriers 1 are shown in the figures. The optional elbow rest 3 is shown near the operator's elbows. Non-limiting locations of the optional racks 2 and optional item and gear carriers 1 are shown in FIGS. 1 and 2, but and other locations are contemplated. A frame 9 structure is shown, but it is not intended to limit the frame design in any way. FIGS. 1-6 show exemplary embodiments and are not meant to be limiting the walkers of the invention in size, design, frame design, wheel size, wheel location, steering mechanism size of location, or the locations or type of frame or frame support structure, or limit item and gear carriers 1 number or locations on the walker of the invention.

Figure 3:
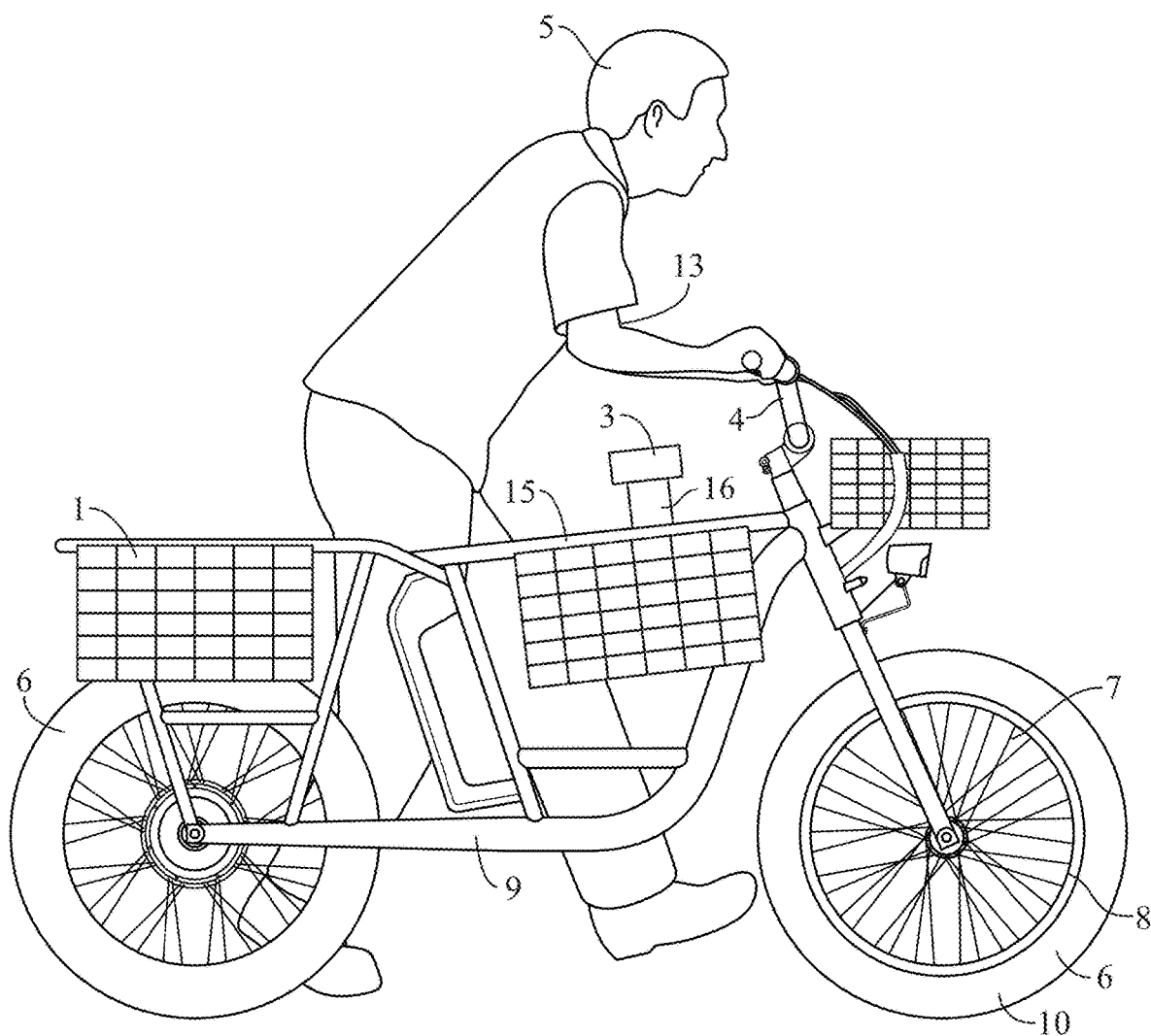
FIG. 3 shows a side view of a walker, in accordance with embodiments disclosed herein.

A "component" of the walker of the invention is any part of the walker except the frame structure. Some embodiments of the walker of the invention may allow some riding-on while operated on downhill or flat surfaces and trails using, for example, a foot rest or a seat while coasting. However, most operation especially uphill operation will use pushing for locomotion. The walkers of the invention do not have a drivetrain for non-electrical motor assist embodiments and are powered by pushing and optionally coasting. The "centerline" of the walker of the invention is the line drawn between the two wheels supporting walker. The two wheels 6 supporting the walker of the invention are shown in FIGS. 1-3. The phrase "two inline wheels" means that the walker of the invention will have a front and back wheel that are inline in the direction of travel and placed approximately as shown in FIGS. 1-3. A walker of the invention will have a front and back wheel with the weight of the walker and weight of any carried items or gear primarily on the front and back wheels with the weight of the walker and carried items and gear centered about midway between the front and back wheels which is typical of a ride-on bicycle. The front and back wheels of the walker of the invention can be offset a bit offline of the centerline and still be within the scope of the claims. Auxiliary wheels can be present and still be within the scope of the claims, and non-limiting examples are training wheels, small wheels touching the ground or wheels not touching the ground.

What is meant by handlebar steering mechanism is a handlebar attached to the front wheel to control the direction of the front wheel and direction of walker travel. The handlebar steering mechanisms used on walkers of the invention are the same or similar to the steering mechanisms used on ride-on bicycles a wide variety of which are known in the ride-on bicycle art. The leaning forward and weight supported on the walker of the invention can be accomplished by the handlebar 4 alone. This allows sufferers of LLS and the other medical conditions mentioned previously to walk with less or no pain. The stick figure (operator) 5 is shown in a leaning forward position with the shoulders 12, elbows 13 and hands 14 significantly in front of the hips 11 with the hands holding the handlebars 4. In FIGS. 1 and 2, the shoulders 12 are about 12 inches in front of the hips, the elbows 13 about 20 inches in front of the hips, and the hands 14 about 30 inches in front of the hips. This is the leaning forward position that greatly benefits LLS suffers and can only be attained by forward lumbar flexure and by transferring significant weight to the walker handlebars 4. For example, the human/stick figure (operator) 5 in FIGS. 1-3 in that particular stance on a level surface would transfer about 10% to 20% of their body weight to the walker. Placing significant body weight on the walker is "leaning on the walker." Leaning on the walker will allow travel with less fatigue, and especially, will allow persons transporting items and gear on the walker to do so with less fatigue. A leaning on position reduces weight on the back and spine and may reduce nerve pinching and other spinal and lower body weight problems.

Embodiments of the walker of the invention provide a leaning forward, pushing position which can potentially provide pain and fatigue relief. This may be enabled by just the handlebars 4, which allows a leaning forward position and weight to be transferred to the walker of the invention. FIGS. 1-3 show an example of elbow rest 3 location. If an optional elbow rest is used it can be part of the handlebar steering mechanism or separate. The handlebars 4 allow a leaning forward position and enable weight to be transferred to the walker of the invention, like leaning on a shopping cart in a store. If present, the optional elbow rest 3 can also enable weight to be transferred to the walker of the invention.

The walker of the invention will also benefit non-handicapped persons transporting items and gear with greater ease and less fatigue by providing transport of the items and gear on the walker rather than in a backpack or other weight carrying devices wheeled or not wheeled.

Embodiments of the walker of the invention specialized for rugged trail are a walker is well-specialized, well-constructed and lightweight. Such specialization might enable uphill and downhill travel with greater ease and with less fatigue.

Embodiments of the walkers of the invention differ in significant respects from standard 3- and 4-wheeled walkers designed for handicapped persons or persons needing walking assistance. For example, the walkers of the invention have two inline wheels, they have a longer front to back wheelbase, they have a narrower track, they can optionally carry more items and gear, the operator is positioned between the wheels of the wheelbase for stability, and they are specialized for rugged and non-rugged trail, city walkways and building use. The wheelbase is defined as the distance between the hubs of the two wheels supporting the walker. The preferable wheelbase is between 15 inches and 60 inches. Embodiments of the wheelbase of the walker of the invention can vary depending on specific use requirements.

Other embodiments of the invention provide walking assistance to anyone using a rugged or non-rugged trail or backpacking. Using a backpack on rugged trails is traditional, but backpack carrying is hazardous. Everyone is susceptible to weight bearing injury acute and long term. Therefore, the walker of the invention provides advantages for anyone needing to transport items and gear while walking. Non-limiting examples of items are luggage, supplies, clothing, shelter, gear, water, food, weapons, and the like. The walker of the invention may prevent or decrease joint and other weight bearing injuries and accidents, for example knee, leg, foot, ankle, back, shoulder and hip injury by providing walking support and packing weight on the walker of the invention rather than carrying in a backpack, bodypack, hip pack, shoulder pack and the like. For example, sprained or broken ankles, a common walking injury are more likely when carrying and manipulating weight over rugged terrain. The inline walker of the invention allows more gear and items to be carried and more safely while walking. For example, extra water can be carried in desert areas providing additional safety. Being able to carry more items and gear on rugged trails using the walker of the invention allows carrying more safety equipment, for example, communication devices and other safety equipment.

Handicapped focused 3- and 4-wheeled walkers have a standalone design to help with side-to-side balance. The walker of the invention sacrifices that side-to-side balance for greater front-to-back balance because of the longer front to back wheelbase, narrow track and typically larger wheels. The narrow track of inline wheels of the walker of the invention eases travel on uneven surfaces and over rocks on rough trails and on narrow trails. Inline wheels and larger wheels can also allow for faster travel compared to 3- and 4-wheeled walkers. That front-to-back balance and narrow track may provide greater efficiency in travel over rough or smooth surfaces compared to 3- and 4-wheeled walkers. The walker of the invention will carry items and gear with lower effort and better balance because of the longer wheelbase and narrower track compared to a standard 3- or 4-wheeled walker. The carried items and gear are distributed along the length of the wheelbase and not positioned as high as they are, for example, on a backpack which lowers the center of gravity which improves balance and safety. The walker of the invention weight and weight of items and gear is stabilized by the longer wheelbase and lower center of gravity especially when going uphill and downhill as well as on flat surfaces. Non-limiting examples of positions of the carriers 1 of items and gear are shown in FIGS. 1-4. However, the illustrations are an example and not meant to be limit carriers 1 numbers or locations on the walker of the invention.

Walkers of the invention differ from ride-on bicycles in many ways, for example, walkers of the invention do not have a drivetrain for non-electrical motor assist embodiments to power the walker. A ride-on bicycle is a standard bicycle of a multitude of designs and uses with a pedal operated drivetrain to power locomotion. Ride-on bicycle drivetrains are of a wide variety of different designs a wide variety of which are known in the ride-on bicycle art. Drivetrains for ride-on bicycles can be human powered or electrically powered. The walkers of the invention are specialized for pushing to power locomotion whether electrical motor assisted or not electrical motor assisted. On downhill or level travel, the walkers of the invention may be ridden on in certain conditions, e.g., where pushing is not needed for locomotion, such as going downhill.

Embodiments of the handlebar steering mechanism of the walker of the invention are on the walker centerline and centered near to the front wheel center as they typically are on a ride-on bicycle. Since the walker of the invention is specialized for pushing and support rather than riding on, embodiments may have the handlebars offset from the centerline to provide specialization for pushing and trail use. Embodiments of the elbow rest, if present, may be separate from the handlebars, or may be part of the handlebar steering mechanism. Most embodiments of the handlebar steering mechanism and elbow rest of the invention will be centered on the centerline, but some embodiments may have an elbow rest offset from the centerline.

Some embodiments of the walker of the invention are specialized to carry items and gear, such as, luggage, supplies, clothing, shelter, gear, water, food, weapons, and the like. Some other embodiments of the walker of the invention might be specialized to carry specific items and gear, for example, children, pets, animals, animal carcasses, weapons, or fishing gear. Embodiments of the walker of the invention are specialized for climbing and descending hills, even steep hills on rugged trails transporting items and gear.

Embodiments of the walker of the invention have outside wheel diameter preferably greater than 5 inches. Wheels are part of a level system centered on the wheel hub. So, larger diameters have a longer level arm which can smooth travel over uneven and rugged surfaces. Larger diameter wheels also have radial momentum which can smooth travel of rugged and uneven surfaces. For rugged trails or use on uneven surfaces, the wheels diameters will advantageously be greater than 5 inches, for example, advantageously greater than 10 inches in outside diameter but no greater than 40 inches in outside diameter.

Embodiments of wheels of the walker of the invention are a rim and tire design similar to standard ride-on bicycles with many designs a wide variety of which are known in the ride-on bicycle art. FIGS. 1-4 show the location of the rims 8, spokes 7 and tires 10. The wheels 6 of a walker of the invention specialized for trail use may be specialized for lightweight with many designs a wide variety of which are known in the ride-on bicycle art. Embodiments of the rims 8 of the walker of the invention are metal, plastic, or fiber reinforced plastic with many designs a wide variety of which are known in the ride-on bicycle art. Embodiments of the wheels of the walker of the invention may have any number of metal spokes, but they can be of other materials, for example, plastic spokes, wire spokes, and fabric spokes or rope spokes, with many types and designs a wide variety of which are known in the ride-on bicycle art. The number of spokes can vary over a wide range, for example, anywhere from two spokes to 60 spokes with many designs a wide variety of which are known in the ride-on bicycle art. For example, spokeless wheels are known in the art of ride-on bicycles, embodiments of walkers of the invention can use spokeless wheels. Embodiments of the tires 10 of the walkers of the invention can be air filled rubber and similar to standard ride-on bicycle tires a wide variety of which are known in the ride-on bicycle art, or solid rubber, but other embodiments of tires 10 of walkers of the invention can use other materials and designs, and they may be specialized for specific uses. For example, some embodiments of the tires might be smooth for paved walkways and smooth surface use and other embodiments knobbed for rugged trail use. Another example is wider tires could be beneficial under some use conditions, for example, sandy trail conditions and tires with spikes for travel in snow conditions. Many embodiments of walkers of the invention will use components similar to or the same as ride-on bicycles a wide variety of which are known in the ride-on bicycle art.

Embodiments of the walker of the invention will be sized for average sized adults and other embodiments sized for smaller adults and for children. Typically, a walker of the invention specialized for an average sized adult will use larger wheels than a walker of the invention specialized for child use.

Embodiments of the walker of the invention may have refinements, such as, the walker structure might be used as part of a shelter support structure. The shelters can be constructed from nylon or other materials commonly used for backpacking shelter construction. The shelter can be erected using the walker of the invention as part of the support of the shelter. In addition to the walker, there may be further pieces of support structure for the shelter. A non-limiting example of additional pieces is tent pole like structures that work together with the walker to complete the support structure for a shelter.

A further embodiment is a walker of the invention that can be used by handicapped persons on trails in the National Parks and National Wilderness Areas. National Parks and National Wilderness Areas currently have restrictions against mechanical devices on park trails, but restrictions are lifted if the device is needed for medical or handicapped use. The National Park rules for mechanical devices are detailed in a Department of Interior publication titled, "All In. Accessibility in the National Park Service," 2015-2020, which is incorporated herein by reference.

A further embodiment is a walker of the invention that can be used by handicapped persons on trails in the National Wilderness areas or other areas restricting the use of mechanical devices, for example, state parks, county parks and city parks. National Wilderness areas and certain other areas have restrictions against the use of mechanical devices on trails, but those restrictions are lifted if the device is needed for medical or handicapped use. The rules in USDA areas are discussed in, "Accessibility Guidebook for Outdoor Recreation and Trails," by USDA, April 2012 which is incorporated herein by reference.

Embodiments of the walker of the invention may have a "kickstand," auxiliary wheel, or other mechanism for staying upright when not being held by an operator.

Embodiments of a walker of the invention may have a foot rest or seat. The seat may be a fold out seat and the foot rest a fold out design. Such additions might be useful for downhill travel or level travel or for resting. With such additions the walker of the invention might be temporarily ridden on while the walker is coasting downhill or coasting on level ground or by kick locomotion like a child's scooter.

Further embodiments of the walker of the invention have optional racks and optional carriers. FIGS. 1-4 show non-limiting locations of the optional racks 2 and optional item and gear carriers 1. In particular, a front wheel rack or a side rack are possible locations not depicted in FIGS. 1-3.

Non-limiting examples of carriers are baskets, packs, racks and panniers for packing and carrying items and gear, such as, luggage, supplies, clothing, shelter, gear, water, food, weapons, and the like. A further embodiment is a walker of the invention where the optional rack and carrier locations are optimized for various uses, for example, for travel on rugged or non-rugged trails, for travel in paved walkways, or for travel inside buildings. The racks and carriers can be made of metal, fabric, plastic or other materials known in the ride-on bicycle art. The racks and carriers might be the same or similar to the wide variety known in the ride-on bicycle art. The optional carriers can be packs, for example, nylon backpack type or pannier construction that attach to racks. The optional carriers are optionally made of or protected by a mesh or wire mesh that are varmint resistant to protect against varmint damage. Some of the carriers may be bear resistant containers.

Embodiments of the walker of the invention may have detachable packs or daypacks that serve as item and gear carriers while on the walker, but then are detachable for other uses. That way the walker of the invention could be a mobile base-camp where side trips could be done with removal backpacks, for example, fishing side trips, hunting side trips or climbing side trips.

Embodiments of the walker of the invention might be useful to carry items and gear for family outings, such are day outings, overnight outings, and backpacking trips. The ability for walkers of the invention to pack items and gear would be advantageous for family outings.

Further embodiments are walkers of the invention that can be used by handicapped persons on airplanes, buses, cars, trains and other transportation uses.

Embodiments of the walker of the invention may have various adjustable components which may also be "quick release" which means levers for rapid component adjustment or component removal. Non-limiting examples are adjustable and possible quick release wheels, handlebars, elbow rests, foot rests, seats, racks and carriers. Non-limiting examples of height adjustable components are handlebars, elbow rests, foot rests and seats. For example, as shown in FIGS. 1 and 3, the elbow rest 3 can be attached to the frame 9 via a height-adjustable component 16. A further embodiment is adjustable or removable components which could be useful on rugged trails to negotiate tough or narrow trail sections.

Embodiments of a walker of the invention may have a structure that can fold. Folding means a frame configuration that can rapidly be compacted for easy transportation on, for example, trains, buses, trucks, cars and airplanes and for storage. Folding bicycles are well known in the ride-on bicycle art. Walkers of the invention could have similar designs to such folding bicycles only without a drivetrain. Such folding walkers would be advantageous for travel and storage and within the scope of the claims.

Preferred embodiments of the walker of the invention are specialized for lightweight, for example, the design can be for lightweight, and the materials of construction can be lightweight, a wide variety of which are known in the ride-on bicycle art. Lightweight tires and components may be advantageous for the walker of the invention and are known in the ride-on bicycle art.

FIGS. 1-3 show non-limiting frame shapes 9 for a walker of the invention. Embodiments of the frame shape and size of the walkers of the invention can vary over a wide range and many designs suitable of walkers of the invention will be similar to ride-on bicycle frames a wide variety of which are known in the ride-on bicycle art. For example, as shown in FIGS. 1-3, the frame 9 can include the longitudinal centerline bar 15. The frame may be specialized for certain applications. For example, rugged trail use with heavy loads might need a stronger frame than non-rugged trail use or paved walkway use. The frame shape and location of the supports can vary in any way with no limitations on the location of the frame supports, the wheel and hub attachments, or the support design. The frame supports and tubes can be round or square, wide or narrow, or anything in between.

Frame designs of the walker of the invention are flexible and may not be similar to ride-on bicycles. For example, an embodiment of the walker of the invention is a non-linear front to back frame design which allows the operator to better align their center to the weight center of the walker. A further embodiment is a walker of the invention where the frame comes over the operator rather than to the side of the operator.

Embodiments of the frame of the walker of the invention can be constructed from materials similar to or the same as the wide variety known in the ride-on bicycle art. Non-limiting examples include iron, steel, aluminum, chromaloy (chromium, molybdenum, steel alloy) steel, and plastics.

Other embodiments are walkers of the invention with frames specifically designed for lightweight. Since pedals, drivetrain for non-electrical motor assist embodiments and seat are not needed on the walker of the invention, their elimination will reduce weight. Also, since the walker of the invention is not necessarily designed to be ridden and carry the weight of a person, the frame structural components might be lightened. A further embodiment is the walker of the invention is made of lightweight materials known in the art of ride-on bicycles. Non-limiting examples are aluminum, chromoly (chromium, molybdenum, steel alloy), steel, plastic, reinforced plastic, or polymer matrix composite with reinforcing fibers of carbon fiber, fiberglass, aramid fiber, or other reinforcing fiber.

Figure 4:
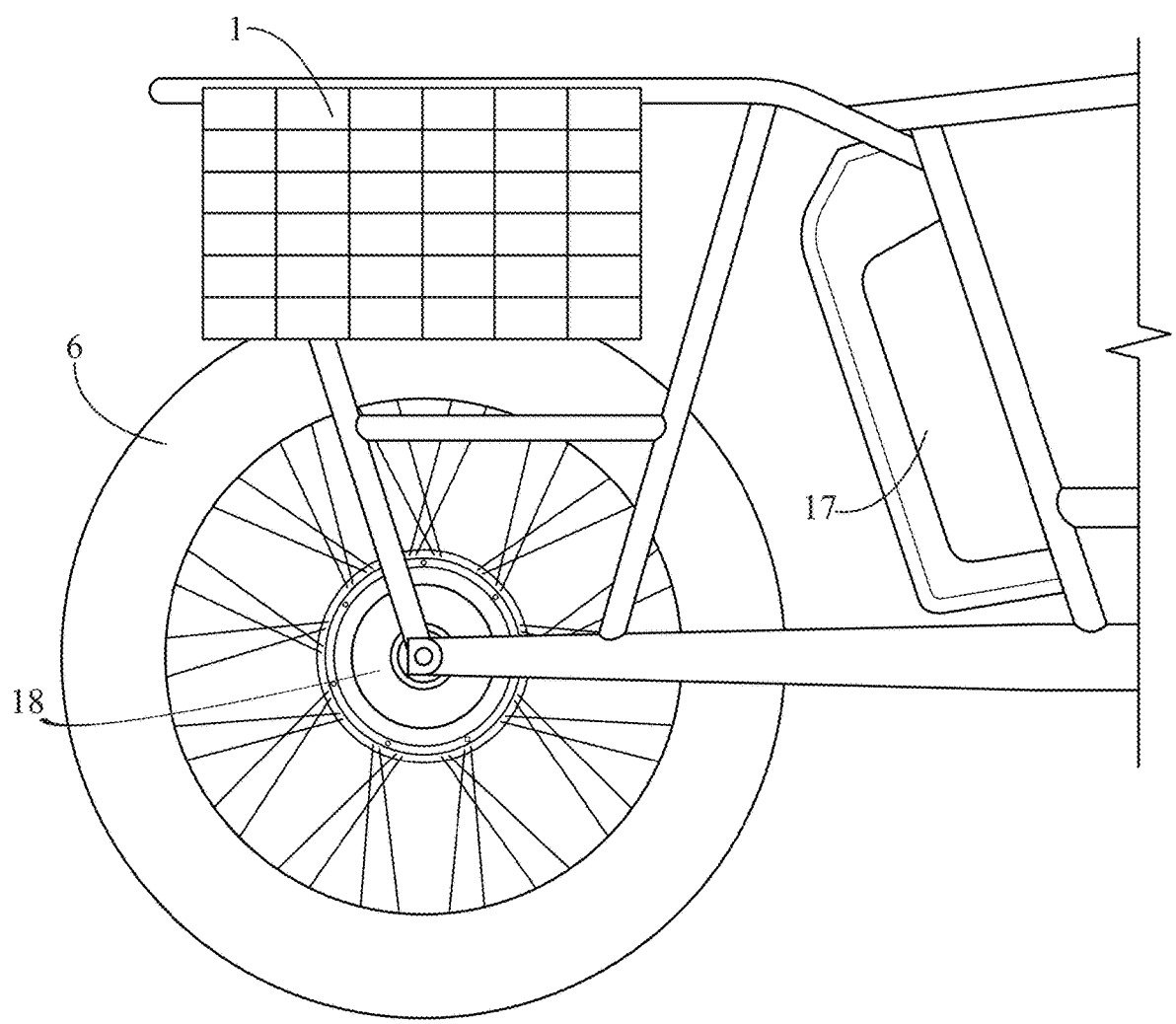
FIG. 4 shows a partial, zoomed-in side view of the walker in FIG. 3, in accordance with embodiments disclosed herein.

A further embodiment is a walker of the invention specialized for pushing rather than riding on includes an electric or gasoline motor to assist the pushing burden, especially for uphill and level travel, but this walker of the invention does not have pedals to operate the drivetrain. If electric, the walker of the invention may be powered by solar cells and batteries or just batteries. Other embodiments of walkers of the invention specialized for pushing rather than riding on have electrical motor power assist would be especially advantageous for handicapped persons. For example, as shown in FIGS. 3 and 4, the walker of the invention can include the electric motor 18, which can be attached to the hub of the rear wheel 6, and the battery 17, which can be attached to the frame 9. The National Park, National Wilderness areas and other areas restricting mechanical devices permit electrically powered locomotion on devices used on trails by handicapped persons. Certain assist devices can incorporate smart features, such as, providing only the amount of power needed for powered assist. Embodiments of the walker of the invention that are power assisted by an electrical or gasoline motor will not have pedals attached to the power drivetrain.

Figure 5B:
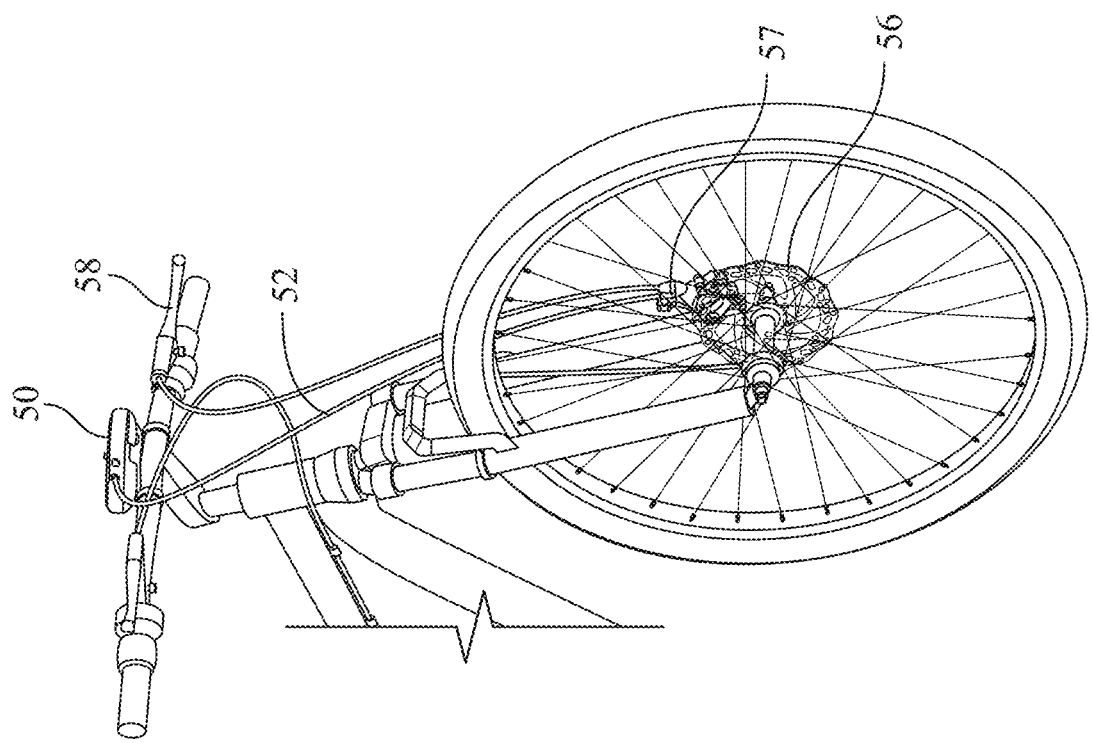
FIG. 5B shows a partial, front perspective view of the walker in FIG. 3, in accordance with embodiments disclosed herein.
Figure 5A:
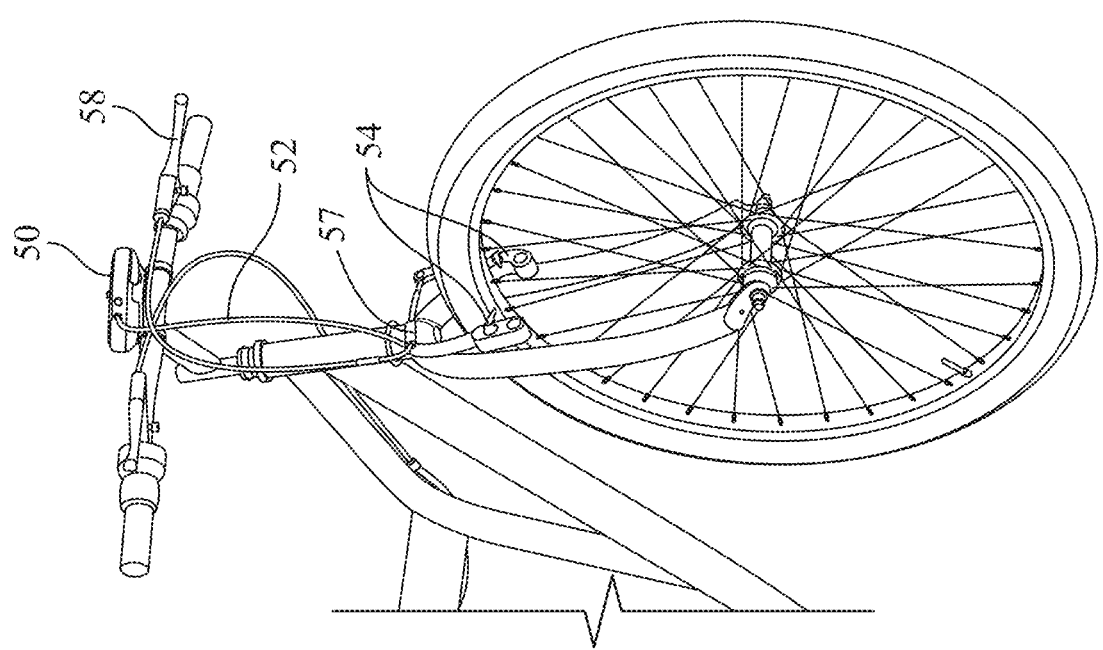
FIG. 5A shows a partial, front perspective view of the walker in FIG. 3, in accordance with embodiments disclosed herein.

The walker of the invention will have a braking mechanism. Embodiments of the mechanism include a rim brake design, disk brake design, an in-hub design, or similar or other designs known in the art of ride-on bicycles. These braking mechanism designs may be similar to or the same as those used for ride-on bicycles, and a braking mechanism may be required for safe use of walkers of the invention. Examples for the locations and design of the brake levers 58, the rim brake mechanism 54, or the disk brake mechanism 56 are shown in FIGS. 5A and 5B. In some embodiments, the braking mechanism(s) will be hand operated by the levers 58 and might use cables controls or electrical controls. Cables can be used as part of the brake mechanisms or to control the brake mechanisms. Especially useful are the cables like the types known in the art of ride-on bicycles. Some embodiments of the braking mechanism for uphill and downhill travel are configured to prevent forward-sliding runaway and backsliding. Such embodiments can have adjustable and settable controls on the braking mechanisms that can be adjusted to the incline of the terrain. The controls may include a runaway protective device that applies stopping force to the walker of the invention when grip is lost on the walker on inclined terrain. The runaway protective device might be mechanical (e.g., cable) or electrically operated.

As shown in FIG. 5A, for example, the braking mechanism can include the rim brake 54. In such embodiments, the stopping force applied to the rim brake 54 is adjustable and settable using the controller 50 via one or more cables 52. In such embodiments, the rim brake 54 can include friction pads that contact opposing sides the wheel rim to apply the stopping force. The friction pads can be activated by a corresponding actuator mounted to the bicycle frame, such as the post or fork portion of the bicycle frame. Any suitable actuator can be used, including, for example, the calipers 57, a direct pull actuator, or a cantilever actuator. The actuator is configured to apply the braking force (e.g., a squeezing pressure) to opposing sides of the wheel rim via the friction pads. In some embodiments, the cable 52 is a metal cable. In other embodiments, the cable 52 is a sealed line comprising hydraulic fluid.

As shown in FIG. 5B, for example, the braking mechanism can include the disc brake 56. In such embodiments, the stopping force applied to the disc brake 54 is adjustable and settable using the controller 50 via one or more cables 52. In such embodiments, the disc brake 56 can include a metal rotor that is attached to or attachable to the hub of the wheel and corresponding caliper 57 attached to the bicycle frame, including, for example, the fork portion of the bicycle frame. The caliper 57 is positioned and configured to apply the braking force (e.g., a squeezing pressure) to opposing sides of the metal rotor. In some embodiments, the cable 52 is a metal cable. In other embodiments, the cable 52 is a sealed line comprising hydraulic fluid.

In some embodiments, the controller 50 is an electronically controlled device. In such embodiments, the controller 50 includes an interface with push buttons or other components (e.g., dial, knob) that allow the user to adjust the amount of friction applied by the brake caliper 57 and to control or minimize the forward sliding while traveling downhill.

In some embodiments, the controller is a ratchet or similar mechanism type of controller that is configured to control forward sliding or runaway during downhill travel. In such embodiments, the "ratchet controller" 60 can be mounted to the handlebars and connected to a brake caliper. In such embodiments, the ratchet controller may be adjustable and settable to the pitch of the terrain by modifying the tension applied to the cables connected to the caliper. In some embodiments, the cable is a metal cable. In other embodiments, the cable is a sealed line comprising hydraulic fluid or components capable of transmitting electric signals (e.g., wire, optical). In some embodiments, the ratchet controller may include a runaway protective setting that applies stopping force to the walker of the invention, which can prevent runaway when the user loses grip on the walker while traveling downward on an inclined terrain.

Figure 6:
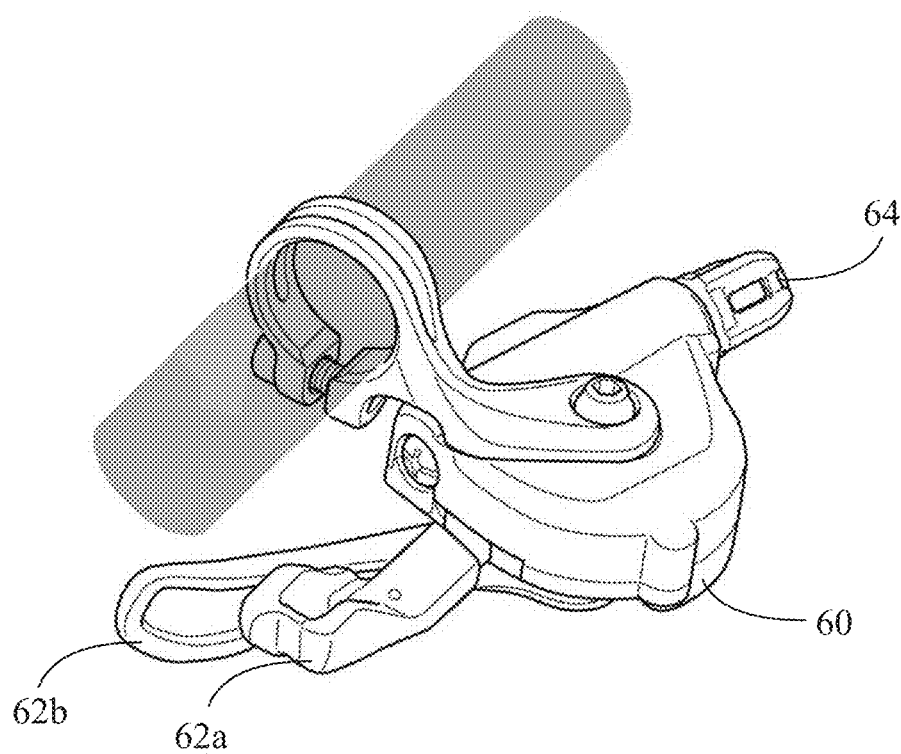
FIG. 6 shows a perspective view of an exemplary ratchet device for a brake mechanism, in accordance with embodiments disclose herein.

In some embodiments, the ratchet controller includes one or more pivotable paddles that the user can push to adjust the resistance applied to the brake caliper 57. In some embodiments, for example, the pivotable paddle is similar to a controller used to change gears on a bicycle. In some embodiments, the ratchet device includes two pivotable paddles, whereby one paddle is used to increase the resistance applied by the caliper 57 to the brakes and the other paddle is used to decrease the resistance and/or to reset the resistance to a default setting. For example, as shown in FIG. 6, in some embodiments the ratchet controller 60 includes the pivotable paddles 62a and 62b for increasing and decreasing the amount of friction applied by the calipers 57 which in turn controls the forward sliding resistance going downhill. In such embodiments, the ratchet controller 60 includes the connection 64 for coupling the device to the brake caliper 57 using the cable 52. During use, the tension on the cable 52 coupled to the connection 64 can be adjusted using the paddles 62a and 62b along with internal components. In some embodiments, the cable is a metal cable. In other embodiments, the cable is a sealed line comprising hydraulic fluid or components capable of transmitting electric signals (e.g., wire, optical).

In various embodiments, the calipers are a standard brake calipers 57 controlled through the hand levers 58 and incremental friction force can be applied by the controller 50 to improve the user's control during downhill travel.

In some embodiments, as shown in FIGS. 5A and 5B, the brake caliper 57 is connected to the brake lever 58 and the controller 50 of the brake mechanism. In some embodiments, the caliper 57 is configured to receive multiple (e.g., two) brake cables. In some embodiments, the brake mechanism includes an adapter configured to couple cables from both brake mechanisms to the caliper (e.g., a brake cable splitter). In some embodiments, for example, the adapter is a Y-shaped device (Y-adapter) that is a component of the caliper control mechanism. In some embodiments, the caliper friction force is adjustable and settable and can be applied to the caliper 57 and brake (54, 56) using one intake of the Y-adapter to control forward sliding resistance. In some embodiments, the other intake of the Y-adapter is connected to the brake lever. The Y-adapter can be configured for mechanical or hydraulic cables.

During use, a user pushing and walking to the side of the walker can adjust (i.e., increase or decrease) the braking force applied to the brake 54 or brake 56 depending on the landscape (e.g., off-road trails having one or more inclining or declining surfaces). In some embodiments, for example, while the user is traveling downward (downhill) on an inclined surface with the walker, the braking force applied to the brake (54, 56) can be adjusted via the controller 50/60 to prevent the walker from forward-sliding and/or to prevent the walker from running away.

In FIG. 5A and FIG. 5B, the braking mechanism shows the brakes (54, 56) on the front wheel of the walker. While not shown in the figures for reasons of conciseness, in some embodiments, the brake 54 or 56 is positioned on the rear wheel. While not shown in the figures for reasons of conciseness, in some embodiments, the braking mechanism includes a first brake 54 or 56 on the front wheel and a second brake 54 or 56 on the rear wheel. In such embodiments with the first and second brakes, the braking force applied to the front and rear brakes may be the same or different. For example, while walking downhill, it may be preferred to apply a greater braking force to the rear wheel than the front wheel to prevent the rear wheel from lifting off the traveling surface (e.g., trail, ground) due to too much braking force on the front wheel.

In some embodiments, the braking mechanism comprises the brake 54 or brake 56 on the front wheel and a traditional, generally non-adjustable brake on the rear wheel. In some embodiments, the braking mechanism comprises the brake 54 or brake 56 on the rear wheel and a traditional, generally non-adjustable brake on the front wheel. In such embodiments, the user can adjust the braking force on the brake 54 or brake 56 while, independently, manually control the traditional non-adjustable brake using a braking hand lever mechanism 58. In this context, the adjustability of the brake mechanism refers to tension applied to the calipers and brakes based on the incline of the terrain. Traditional, generally non-adjustable brakes have some adjustability by increasing the tension on the cable via the screw in the brake lever, but that adjustability is unrelated to a consistent braking force applied based on the incline of terrain.

In some embodiments, the walker comprises the brake 54 or brake 56 and does not include the electric motor 18. In some embodiments, the walker comprises the electric motor 18 and either the brake 54 or the brake 56. In such embodiments, the electric motor 18 is mounted on the rear wheel and the brake 54 or brake 56 is coupled to the front wheel. In other embodiments, the electric motor 18 is mounted on the front wheel and the brake 54 or brake 56 is coupled to the rear wheel. During use, while traveling uphill on an inclined terrain, the electric motor would engage with a wheel and the controls of the motor would provide power to drive the walker uphill. In such embodiments, the electric motor, or a controller in communication with the same, would include a button that can deactivate the motor when the user loses their grip on the handlebars.

In some embodiments, the braking mechanism is an in-hub brake mechanism. In some embodiments, the braking mechanism is an adjustable in-hub brake. Such an embodiment would be particularly useful during uphill travel on an inclined terrain. In some embodiments, the braking mechanism includes an in-hub ratchet mechanism or a system comprising a pawl and drive ring. In such embodiments, the ratchet mechanism or the pawl and drive ring system would have a disengaged mode that allows the user to push the walker uphill without friction and which allows the wheel to passively free wheel. In the disengaged mode, the user may hear a clicking sound from the ratchet mechanism (e.g., a pair of rings, each having teeth extending from one face that are configured to engage one another) or the pawls contacting the drive ring as the wheel freely rotates in a forward rotation. In such embodiments, the mechanism would also include an engaged mode that stops the wheel when its forward rotation is stopped, whereby the wheel is prevented from rotating in a backward rotation. In some embodiments, for example, the mechanism is configured to prevent backsliding during uphill travel. In some embodiments, for example, while pushing and walking to the side of the walker in an upward (uphill) direction on an inclined surface, the user can adjust the stopping setting using a controller in communication with the in-hub brake (e.g., a device similar to a free hub body that is connected to the hub). In some embodiments, the in-hub brake mechanism comprises an actuator that prevents the engaged mode so the user can walk the walker in a backward direction without the in-hub brake stopping the wheels from rotating backward. In some embodiments, for example, the actuator is a pin, lever, button, or the like, which is configured to prevent the components (e.g., the pair of rings or the pawl and drive ring) of the brake mechanism from engaging with one another in a manner that prevents the wheel from rotating backward.

A further embodiment is a walker of the invention with lights for travel at night or better visibility in the day. The lights may flash for certain applications. The lights may be in the front and back of the walker of the invention.

The above detailed description of exemplary embodiments of the invention is provided to illustrate the various aspects of the invention, and is not intended to limit the scope of the invention thereto. Persons of ordinary skill in the art will recognize that certain modifications can be made to the described embodiments without departing from the invention. All such modifications are intended to be within the scope of the appended claims.

Exemplary embodiments and examples of the systems and methods are described above in detail. The systems and methods are not limited to the specific embodiments described herein, but rather, components of the systems and/or steps of the method may be utilized independently and separately from other components and/or steps described herein. For example, the system may also be used in combination with other systems and methods, and is not limited to practice with only a system as described herein. Rather, the exemplary embodiment can be implemented and utilized in connection with many other systems.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context.

As used herein, the use of examples, or exemplary language (e.g., "such as"), is intended to illuminate the embodiments and does not pose a limitation on the scope of the claims unless otherwise stated. No language in the specification should be construed as indicating any non-claimed element as essential.

As used herein, the terms "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

This written description uses examples to disclose the present embodiments, including the best mode, and to enable any person skilled in the art to practice the present embodiments, including carrying out the steps of the method. The patentable scope of the present embodiments is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

I claim:

1. A walker for pushing and walking to the side of, comprising:
 a bicycle frame;
 front and rear inline wheels coupled to the bicycle frame;
  wherein the bicycle frame defines a wheelbase between the front and rear inline wheels;
 a handlebar steering mechanism coupled to a first end of the bicycle frame; and
 a first ratchet controller coupled to the handlebar and via a cable to a first brake mechanism located on the front inline wheel or the rear inline wheel, the first ratchet controller comprising a pivotable paddle mechanism configured to increase or decrease the braking force applied to the respective inline wheel to reduce forward-sliding during downhill travel on an inclined surface;

wherein the pivotable paddle mechanism can be engaged by a user during the downhill travel;

wherein the walker has no pedals.

2. The walker of claim 1, further comprising one or more racks coupled to the bicycle frame, wherein each respective rack is configured to carry removably attachable items or gear.

3. The walker of claim 1, wherein the first ratchet controller can increase or decrease the braking force applied by the first brake mechanism to the respective inline wheel to prevent runaway during downhill travel on the inclined surface.

4. The walker of claim 1, wherein the bicycle frame and the front and rear inline wheels are configured for use on an off-road trail.

5. The walker of claim 1, further comprising a second brake mechanism coupled to the front inline wheel or the rear inline wheel; the second brake mechanism configured to incrementally increase or decrease the braking force applied to the respective inline wheel to prevent runaway during downhill travel on the inclined surface.

6. The walker of claim 5, wherein the first brake mechanism and the second brake mechanism are not coupled to same respective inline wheel.

7. The walker of claim 1, wherein the pivotable paddle mechanism comprises two pivotable paddles, whereby one of the respective paddles is used to increase the braking force applied to the respective inline wheel and the other respective paddle is used to decrease the braking force applied to the respective inline wheel.

8. A method of transporting an item or gear on a trail having an inclined surface, comprising:
    providing a walker for pushing and walking to the side of, the walker comprising:
        a bicycle frame;
        front and rear inline wheels coupled to the bicycle frame;
        wherein the bicycle frame defines a wheelbase between the front and rear inline wheels;
        a handlebar steering mechanism coupled to a first end of the bicycle frame;
        a first ratchet controller coupled to the handlebar steering mechanism and via a cable to a first brake mechanism located on the front or rear inline wheel, the first ratchet controller comprising a pivotable paddle configured to increase or decrease the braking force applied to the respective incline wheel to reduce forward-sliding during downhill travel on the inclined surface of the trail; wherein the pivotable paddle can be engaged by a user during the downhill travel; and
        one or more racks coupled to the bicycle frame, wherein each respective rack is configured to carry a removably attachable item or gear;
        wherein the walker has no pedals;
    attaching the item or gear to the respective rack coupled to the bicycle frame;
    setting the adjustable and settable controls of the first brake mechanism; and
    pushing the walker on the trail having the inclined or declined surface.

9. The method of claim 8, wherein the first ratchet controller can increase or decrease the braking force applied by the first brake mechanism to the respective inline wheel to prevent runaway during downhill travel on the inclined surface of the trail.

10. The method of claim 8, further comprising a second brake mechanism coupled to the front inline wheel or the rear inline wheel; the second brake mechanism configured to increase or decrease the braking force applied to the respective inline wheel to prevent runaway during downhill travel on the inclined surface of the trail.

11. The method of claim 10, wherein the second brake mechanism coupled to the pivotable paddle via a cable.

12. The method of claim 10, wherein the first brake mechanism and the second brake mechanism are not coupled to same respective inline wheel.

13. The method of claim 8, wherein the walker further comprises an electric motor coupled to the front inline wheel or the rear inline wheel, the electric motor being powered by a battery.

14. The method of claim 8, wherein the walker further comprises an elbow rest coupled to a longitudinal centerline bar of the bicycle frame between the handlebar steering mechanism and a second end of the bicycle frame.

15. The method of claim 8, wherein the wheelbase is between 15 and 60 inches.

16. The method of claim 8, wherein the bicycle frame and the front and rear inline wheels are configured for use on an off-road trail.

* * * * *